United States Patent [19]

McDermott

[11] Patent Number: 5,187,871
[45] Date of Patent: Feb. 23, 1993

[54] UNDERWATER NAVIGATION DEVICE

[76] Inventor: Damien McDermott, 196 Phillips Dr., Hampstead, Md. 21074

[21] Appl. No.: 826,467

[22] Filed: Jan. 27, 1992

[51] Int. Cl.$^5$ .................. G01C 17/08; G01C 9/12; G01C 23/00
[52] U.S. Cl. ........................... 33/354; 33/352; 33/333; 33/370; 2/430
[58] Field of Search .................. 33/354, 319, 333, 347, 33/349, 351, 352, 355 R, 365, 370, 391; 2/2.1 R, 426–430

[56] References Cited

U.S. PATENT DOCUMENTS

| | | | |
|---|---|---|---|
| 1,253,190 | 1/1918 | Fischer | 33/354 |
| 2,139,670 | 12/1938 | Burgess | 33/351 |
| 3,041,917 | 7/1962 | Glatt | 33/348 |
| 3,084,443 | 4/1963 | Kaatz et al. | 33/352 |
| 3,210,859 | 10/1965 | Fisk et al. | 33/355 R |
| 3,475,957 | 11/1969 | Hiszpanski | 33/333 |
| 3,937,078 | 2/1976 | Williams | 33/352 |
| 4,139,951 | 2/1979 | Cunard et al. | 33/362 |
| 4,141,152 | 2/1979 | White | 33/355 R |
| 4,670,988 | 6/1987 | Baxter | 33/354 |
| 4,953,304 | 9/1990 | Raitman et al. | 33/355 R |

FOREIGN PATENT DOCUMENTS 1140099  11/1962  Fed. Rep. of Germany .......... 2/430

Primary Examiner—William A. Cuchlinski, Jr.
Assistant Examiner—C. W. Fulton
Attorney, Agent, or Firm—1

[57] ABSTRACT

A navigation device for personal use includes a face mask with a transparent window for binocular vision when the device is worn by the user. The face mask has a directional indicator attachement with a multiplicity of symbols to identify the directional orientation of the mask. The directional indicator is attached at a stable location and distance for continuous availability of direct binocular viewing.

26 Claims, 11 Drawing Sheets

Fig. 1
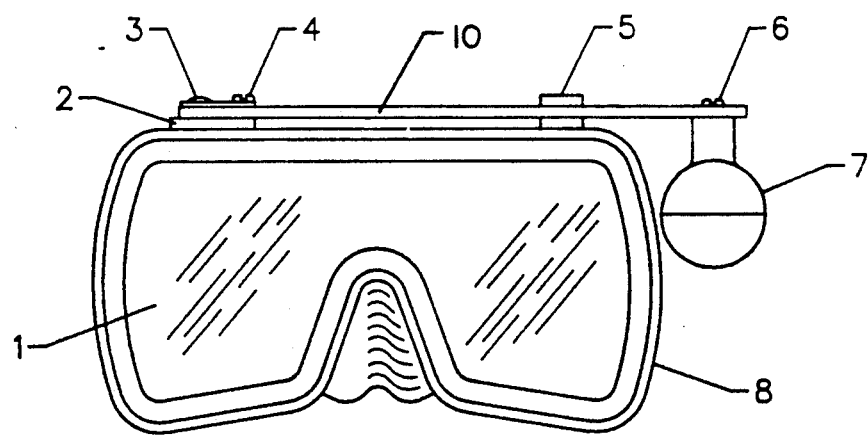
Fig. 2
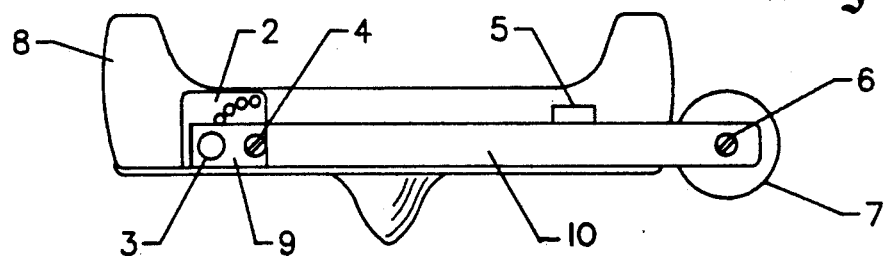
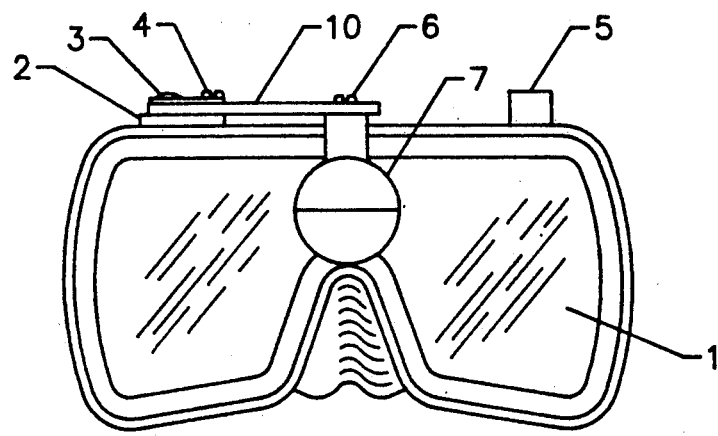
Fig. 3

UNDERWATER NAVIGATION DEVICE

BACKGROUND OF THE INVENTION

1. Field of the Invention

This invention relates to underwater life support apparatus and to personal direction indicators for environments lacking fixed visual reference objects.

2. Related Prior Art

When a diver tries to find his way underwater, a navigational device such as a compass is needed. Many of the present day diver's compasses attach to the wrist. With the wrist mounted compass, the diver must look toward his wrist in order to navigate. His body must usually be repositioned to allow for an accurate reading. It is difficult to focus his eyes on the indices of tee compass while his head and hands are moving in the water. Any movement of his eyes from the forward field of view to the compass on his wrist causes the diver to divert from his intended path. When traveling longer distances, the diver is required to look at his wrist many times, and the cumulative error resulting from these diversions is undesirable.

Prior art designs which attempt to solve this problem include the mask compass, described in U.S. Pat. No. 4,953,304 (Raitman) and U.S. Pat. No. 3,210,859 (Fisk). In these designs a compass mounted on a bracket assembly is moved from a stored position on top of the mask to a viewing position on the face of the mask. When needed, the diver rotates the compass into position. When in position, the compass blocks a fixed portion of the mask. Both designs require viewing optics to permit the diver to view the compass because without the lens or lens and prism in combination, the eye cannot recognize the close up markings. In addition, these monocular compasses substantially block the diver's vision out of one of his eyes. This is undesirable because a diver's total vision is required to prevent unnecessary collisions with underwater obstacles. These designs cover a fixed portion of the mask and therefore, create additional functional problems. If the mask should become dirty or foggy, at the section used by the compass, a diver cannot use the navigational device. The device is also expensive because it requires a complex optical scope to view the compass. The design is further faulted because it requires a precise distance between the diver's eye and the lens for accurate viewing of the compass and therefore does not function equally well or requires adjustment for a variety of masks and face shapes. The diver also will suffer from unnecessary fatigue as only one eye can look into the optical lens.

In addition, the viewing window or eyepiece can become dirty or scratched making it difficult to reliably and clearly view the compass. Prior art design also fails to provide the diver with information providing his angle of ascent or descent. Also as the waters become dark, it becomes difficult to read the prior art compass because light from the water must reflect off the compass and pass through the optics before being viewed. This causes unnecessary attenuation of the limited available light.

Both prior art designs have operational problems as well. U.S. Pat. No. 4,593,304 (Raitman) uses a lens which focuses on a gimbaled compass. This design permits the compass to rotate so that the observer can obtain readings even when his head is not in the vertical position. However, in this mode the compass markings are out of focus because as the compass rotates, the distance between the flat compass rose and lens changes. The design does not compensate for these changes and the image is thus unclear.

Prior art Pat. No. 3,210,859 (Fisk) maintains a constant distance between the lens and compass. However, because the compass is not pivoted it will jam as the diver tilts his head.

U.S. Pat. No. 4,141,152 (White) also includes a lens compass combination. If this design was permitted to rotate the distance between the lens and eye would change and make it difficult for accurate viewing. None of the prior art designs use the refractive qualities of the water to enlarge the viewed symbols or marks of the compass rose.

Some prior art designs incorporate jeweled mechanical bearings to permit the compass to rotate and continue to function regardless of the diver's angular head position relative to the vertical. The friction in mechanical bearings inhibits the compass from attaining the exact horizontal orientation necessary for reliable readings.

Other designs not found in the patent literature include an orb shaped or ball compass mounted on the diver's wrist. All wrist mounted devices require the diver to frequently refocus and redirect his eyes from the forward direction to his wrist as he moves for directional guidance. However, the ball compass design is superior to the flat wrist mounted compasses in that it does not jam as the wrist is rotated in the vertical plane. Ball compasses include a single band of indices which align when the compass is held in the horizontal plane. Thus although the wrist mounted ball compass can rotate and does not jam as the diver ascends or descends it does not provide the additional reference markings required to identify angle of ascent or descent or the azimuth when in other than the horizontal position. A magnifying lens is not usable because the distance or the viewing angle between the diver's eye and ball compass varies.

SUMMARY OF THE INVENTION

My invention attaches a directional indicator or compass to a diver's mask such that its indicating symbols are in the field of view and readable by the diver. During use, the directional indicator is held in a fixed relationship with the diver's eye. Brackets are offered which position the indicator and its symbols within the diver's binocular field of vision and far enough from the diver's eye to permit them to be readable without magnifying or redirecting optics. If a spherical or ball compass is used, it can provide accurate directional indications regardless of the diver's position Additional symbols can provide the diver's angle of ascent. More compact configurations can be achieved by placing a magnifying lens between the diver's eye and indicator symbols to enlarge the symbols indicating heading and angle of ascent.

In a first preferred embodiment of my invention of a face mask navigator, a direction indicator or compass is attached to one end of a pivoting arm which has its other end attached to the mask at a mounting block. This improved design enables the diver to view his compass without the extra body movements of wrist mounted compasses. When needed, the diver rotates the pivot arm so that the compass moves from storage into a viewing position in front of the mask.

In a second preferred embodiment of my invention the direction indicator or compass is centrally positioned on a bracket that bridges the face mask and which is adjustable between a storage position and a range of viewing positions in front of the mask.

In either of these embodiments several major advantages are achieved by locating the compass well in front of the mask. Firstly, it does not physically block any portion of the mask and provides almost unrestricted binocular vision.

Secondly, it avoids telescope optics and lenses having inherent focusing problems related to lens positioning.

Thirdly, salt water in one of the diver's eyes or fog on a portion of his mask faceplate does not prevent navigation.

Fourthly, the diver can easily wipe the exterior of his mask faceplate clean if it should become dirty.

Fifthly, the binocular vision is more comfortable and more reliable and finally, the refraction at the air-water interface contributes substantially to the readability of the compass.

A telescope is not required because the directional markings or symbols on the compass can be positioned an adequate distance from the diver's eye to permit focusing for easy recognition of those markings. Each person depending on his physiology and age requires a different minimum distance to achieve focusing. For this design the compass should be at least one inch in front of the diver's eye. This distance would be longer if the refractive qualities of the water interface were not enhancing the readability of the compass. The mask navigator occupies only a small portion of the field of view and can be left extended without seriously impairing the diver's ability to see. Furthermore, the mask navigator design does not substantially block the diver's eyesight for either eye permitting two eye visibility.

The mask navigator operates in all planes. This allows the diver to use the compass without having to position it horizontally. Thus a precise reading can be achieved while at any diver orientation during the dive. Additionally, it allows the diver to determine if he is ascending or descending. In turbid waters or during cave dives, it is sometimes difficult to identify the upward direction, but with the mask navigator, the diver can determine the direction and angle of ascent or descent without unnecessary movement.

One embodiment uses the spherical compass in combination with a magnifying lens. The lens can be attached to the mask window and the compass rigidly attached in close proximity if single eye vision is acceptable. Unlike prior art designs, the compass functions at all orientations. The fixed relationship between the compass symbols and lens assures focused viewing at all orientations. In addition, the lens magnifies the symbols that are indicating the diver's directional orientation and angle of ascent if required.

Other embodiments include currently commercially available electronic directional indicators or compasses with digital read outs. In these embodiments the digital readout would be substituted for the spherical compass. The compass subassembly of my invention is optionally provided with integral or adjacent optical magnification of the directional markings.

The principal objective achieved by the mask navigator is an improved underwater navigational device.

Another objective of the mask navigator is to permit the diver to determine his angle of ascent or descent.

Another objective of the mask navigator is a navigational device that functions regardless of the orientation of the diver's head.

Another objective of the mask navigator is to permit the diver to navigate without substantially affecting his field of vision.

Another objective of the mask navigator is a navigational device that does not require an optical eyepiece or scope.

Another objective of the mask navigator is a navigational device attached to the mask which does not require additional instrumentation on the diver's wrist.

Another objective of the mask navigator is that the compass be placed a sufficient distance from the mask to permit light from the diver's lantern to illuminate the compass markings for day or night diving.

Another objective of the mask navigator is a navigational device that can be moved into a storage position on the mask to prevent damage during handling.

Another objective of the mask navigator is a navigational device which does not require keen eyesight to function.

Another objective of the mask navigator is to permit the use of smaller symbols on the compass by using the refractive qualities of the water, distance of the symbols from the mask and water mask interface to make the symbols appear larger than they actually are, thereby permitting a reduction in size of the device.

Another objective of the mask navigator is a design that can be moved into a variety of viewing distances to permit proper viewing, regardless of operator's visual characteristics.

Another objective of the mask navigator is a design that can be moved into a variety of viewing positions to permit continued functioning, regardless of fogging or dirt present on a particular section of the mask or a temporary loss in vision in one of the diver's eyes.

Another objective of this invention is a compact navigational device.

Another objective of this invention is a mask mounted underwater navigational device that uses a streamlined orb shaped compass for minimal force exertion upon the mask regardless of the direction of the diver's movement.

Another objective of this invention is a navigational device that permits the user's eye to focus upon and read the directional symbols both above and below the surface of the water.

Another objective of this invention is a navigational device which continues to operate even when the diver's head is in other than the vertical plane.

Another objective of this invention is a navigational device having improved readability because it maintains the distance between the magnifying lens and compass symbols as the diver's head is tilted.

Another objective of this invention is a navigational device which does not have to be moved to permit the diver to wipe his face mask clean.

Another objective of this invention is a navigational device which is more accurately read because the compass is placed within the binocular field of view.

Still another object of this invention is a navigational device which is more accurately read because the compass is within the direct field of view and line of sight of the user and the real image of its symbols are viewed.

BRIEF DESCRIPTION OF DRAWINGS

Other objects and advantages may be observed from the description when viewed in conjunction with the accompanying drawings of preferred embodiments of my invention, wherein:

FIG. 1 is an outer elevation view of the diver's face mask navigator showing the compass in its storage position.

FIG. 2 is a top plan view of the diver's face mask navigator showing the compass in its storage position.

FIG. 3 is an outer elevation view of the diver's face mask navigator showing the compass in a typical operating position.

DETAILED DESCRIPTION OF THE INVENTION

Figure 4:
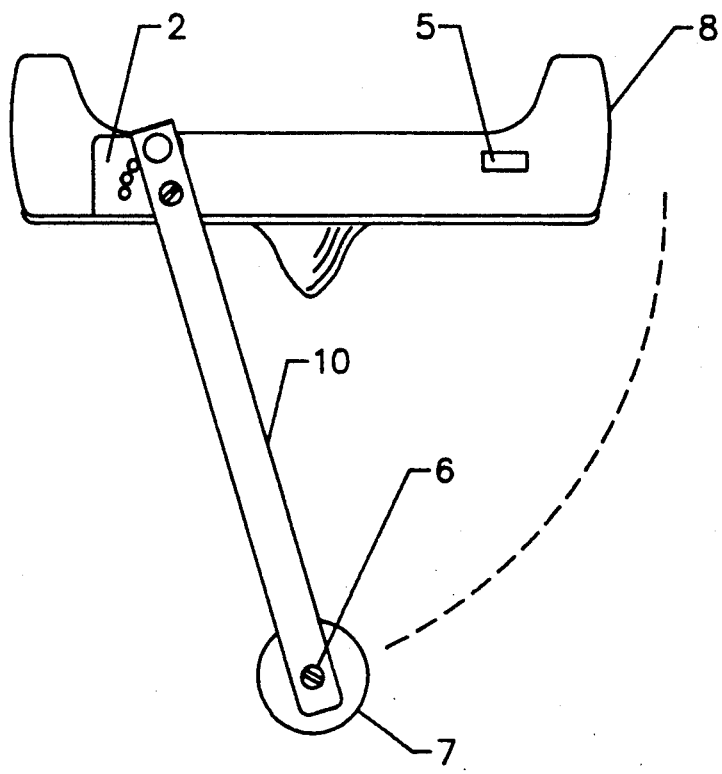
FIG. 4 is a top plan view of the diver's face mask navigator showing the compass in a typical operating position.
Figure 5:
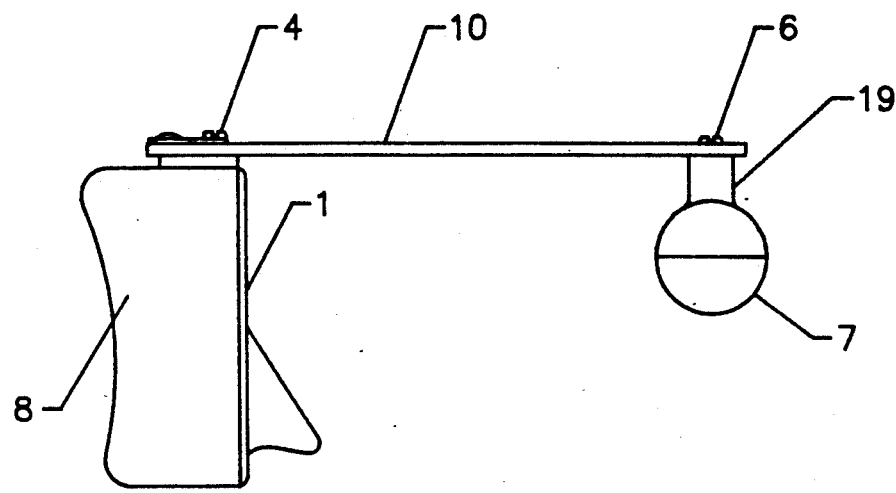
FIG. 5 is a right side view of the diver's face mask navigator showing the compass in a typical operating position.
Figure 6:
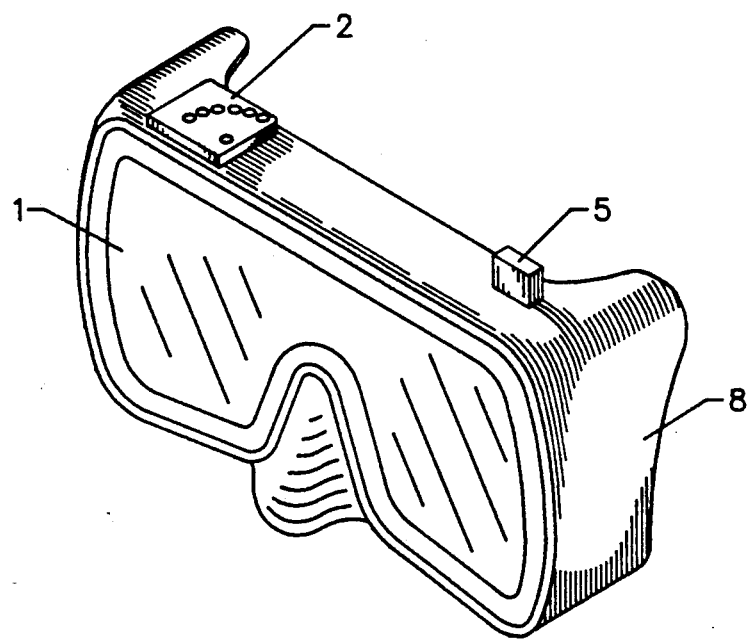
FIG. 6 is a perspective view of a diver's face mask adapted for assembly of the navigating compass.

Beginning with reference to FIGS. 1 and 2, a diver's face mask, absent the head strap which is not a part of my invention, the transparent viewing window 1 is set in the resilient face seal 8. A mounting block 2 is fixed to the top of the face seal 8 off center to one side of the seal 8. At the opposite side of the seal 8 the protruding boss 5 prevents the pivoting arm 10 from rotating against the diver's head. One end of the pivoting arm 10 is attached to the mounting block 2 by the pivot axle 4 about which the diver may rotate the pivot arm 10. At the opposite end of the pivot arm 10, a magnetic compass subassembly 7 is suspended, being secured to the arm 10 by the screw 6. FIGS. 1 and 2 show the magnetic compass 7 positioned in the stowed or storage position out of the view of the using diver. FIG. 3 shows the magnetic compass 7 pivoted into a typical centered position for viewing by the diver, however the diver may choose several viewing positions for the compass 7 between the stowed and centered positions to optimize his personal acuity for the prevailing conditions.

Figure 7:
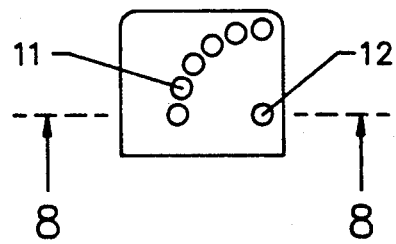
FIG. 7 is a plan view of the compass mounting block.
Figure 8:
FIG. 8 is a cross sectional view of the compass mounting block viewed along lines 8—8 of FIG. 7.
Figure 11:
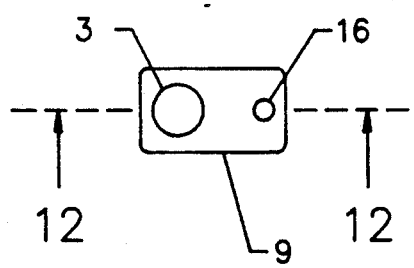
FIG. 11 is a plan view of the compass pivot spring.
Figure 12:
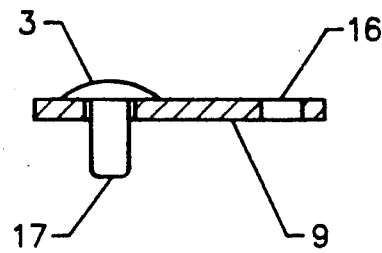
FIG. 12 is a cross sectional view of the compass pivot spring viewed along lines 12—12 of FIG. 11.
Figure 13:
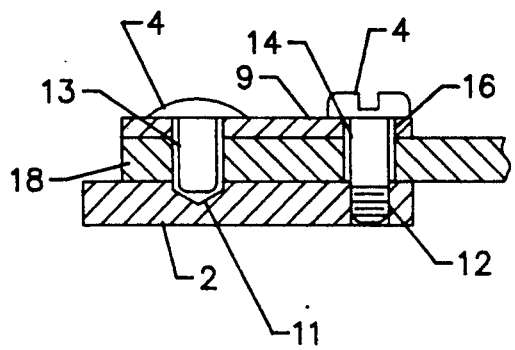
FIG. 13 is a partial cross sectional view of the assembly of the pivot spring of FIG. 11, the pivoting arm of FIG. 9 and the compass mounting block of FIG. 7.

To accommodate various viewing positions for the compass 7 the mounting block 2, FIGS. 7 and 8, and seen in FIGS. 2, 4, 6, and 13, is provided with a multiplicity of recess detents 11 distributed in an arc about the threaded pivot cavity 12 into which the axle 4 provides the pivot point, for arm 10 and the suspended compass assembly 7. The axle 4 engages cavity 14 in pivot arm 10 and cavity 16 in the pivot spring 9. The shaft 17 of the locator pin 3, which is fixed to a pivot resilient spring 9, FIGS. 11-13, projects through the pivot arm cavity 13 in the pivot end 18 of the arm 10 to engage the mounting block 2 and its recessed detents 11, FIGS. 7, 8, and 13. With the shaft 17 of the locator pin 3 in one of the detents 11, the arm 10 and compass subassembly 7 are locked in the selected viewing position.

Figure 9:
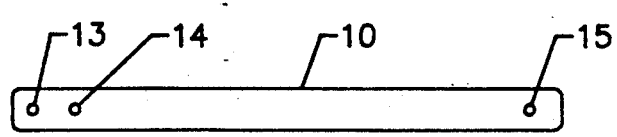
FIG. 9 is a plan view of the pivoting arm.
Figure 10:
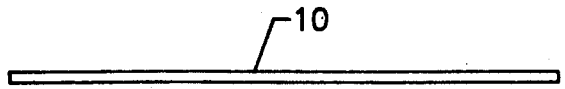
FIG. 10 is a side elevation view of the pivoting arm.
Figure 14:
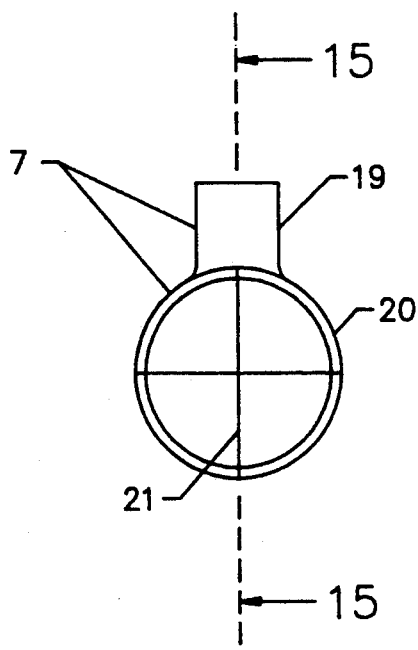
FIG. 14 is an elevation view of the transparent spherical compass shell housing.
Figure 15:
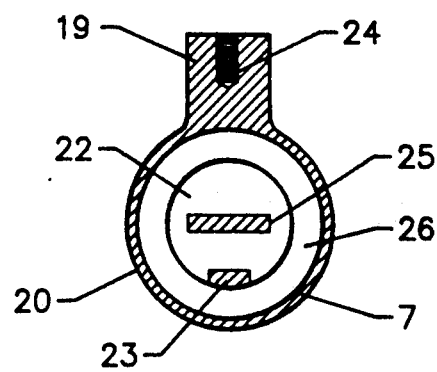
FIG. 15 is a sectional view of the spherical compass subassembly taken along lines 15—15 of FIG. 14.
Figure 18:
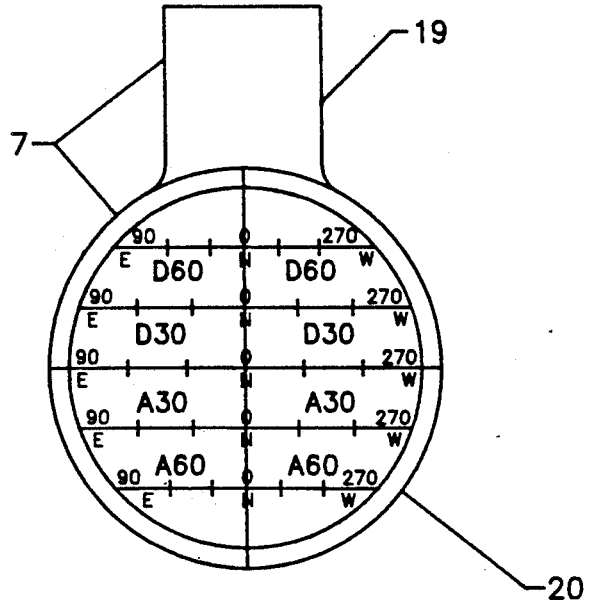
FIG. 18 illustrates the floating magnetic compass inside the transparent spherical compass holder.

The compass subassembly 7, seen in FIGS. 14, 15, and 18, is sensitive to the earth's magnetic field. A transparent spherical container or shell 20 is suspended from the pivot arm 10, by the screw 6, inserted through pivot arm cavity 15, FIG. 9, into the threaded cavity 24 of the shell stud 19, FIG. 15. The spherical shell 20 has reference crosshairs 21, FIG. 14. Within the transparent shell 20, FIG. 15, the magnetic compass assembly 22 is supported in a transparent fluid 26. In a preferred embodiment the assembly holder 22 is spherical in shape, although other configurations are anticipated. The compass holder assembly 22 contains the sensitive magnetic element 25 and a ballast device 23 which orients the floated compass assembly 22 to the earth's vertical direction by gravitational forces.

Figure 16:
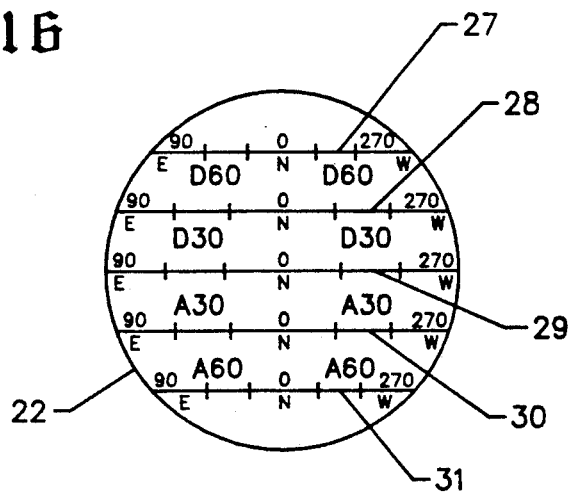
FIG. 16 is an illustration of directional references and markings upon the spherical holder of the magnetic compass.

The orb (spherical) shaped design immersed in a fluid serves to magnify the symbols, FIGS. 16, 18, and permits a more compact compass design which is especially important for a mask mounted navigator. Furthermore, its neutral buoyancy decreases the possibility of the compass affecting the watertight seal between the mask and diver's face. For nighttime diving, the directional symbols on the compass can be marked with a fluorescent or phosphorescent paint. Symbols so marked would be visible because the light emitted by the diver's flashlight or lantern would directly illuminate the symbols and combine with light reflected off the face of the diver's mask onto the symbols to provide enough light for nighttime visibility.

Figure 17:
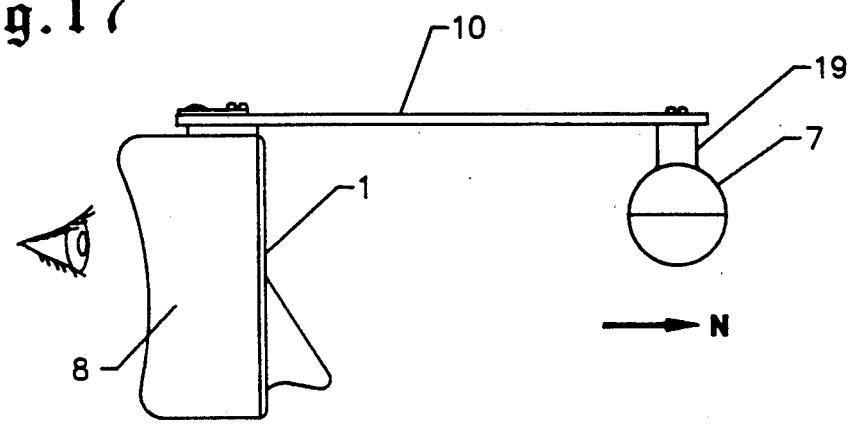
FIG. 17 illustrates a diver's horizontal view of the compass holder.
Figure 19:
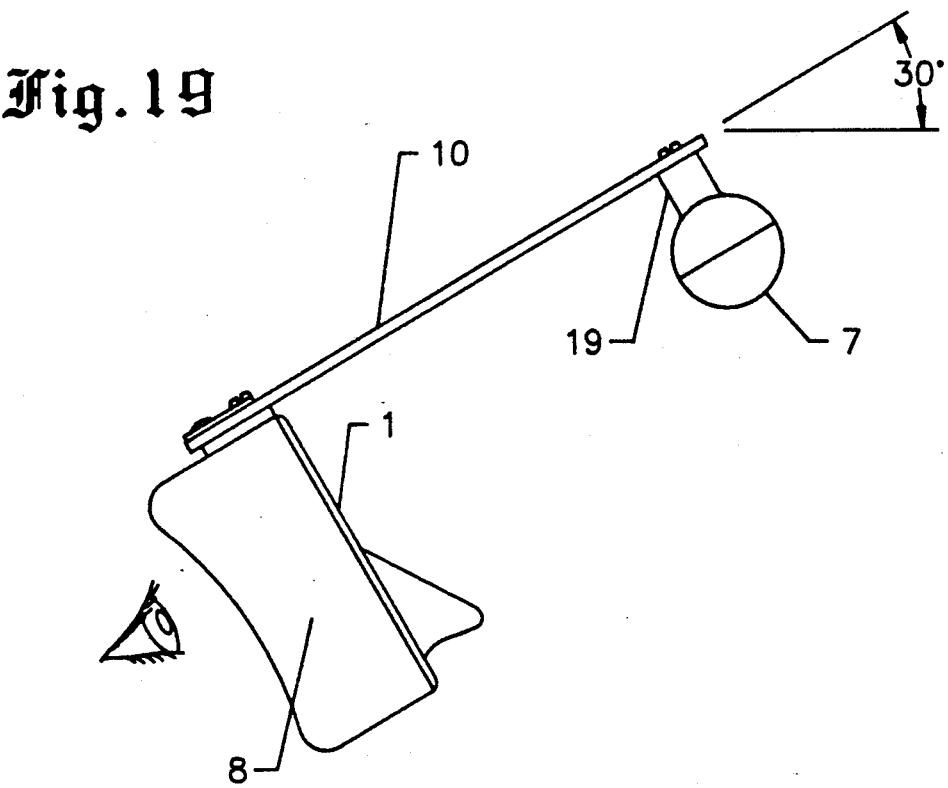
FIG. 19 illustrates the mask navigator with the diver ascending at a thirty degree angle.
Figure 20:
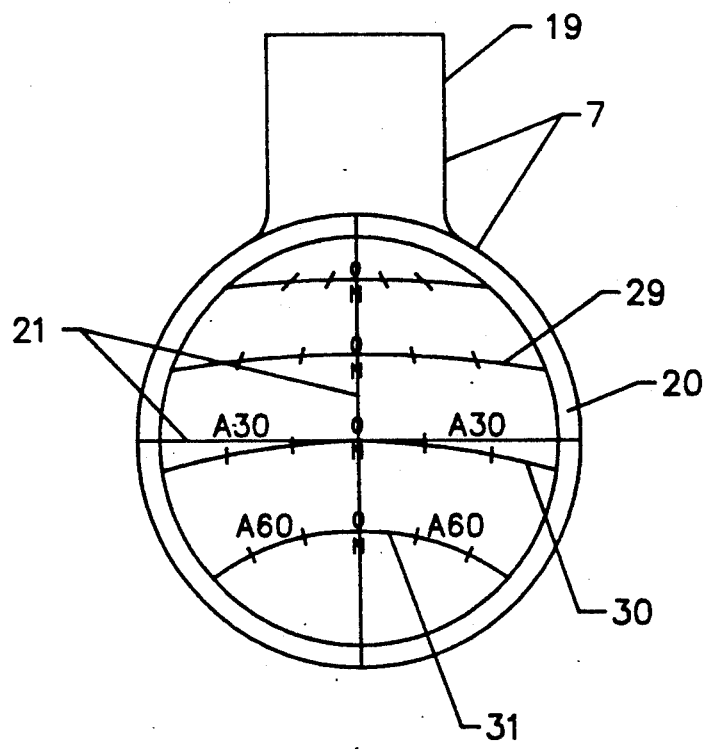
FIG. 20 is a companion illustration to FIG. 19 showing the compass at the thirty degree ascending angle as viewed by the diver.
Figure 21:
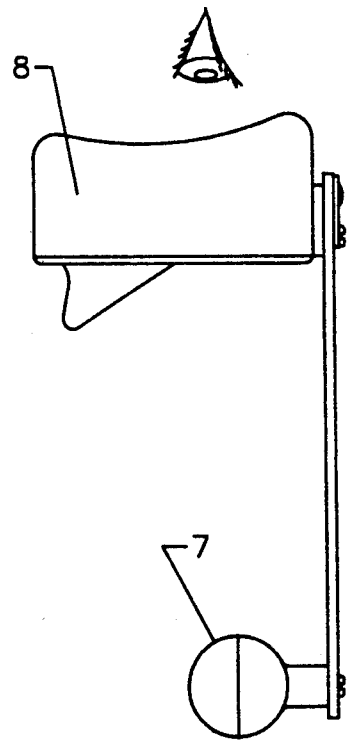
FIG. 21 illustrates the mask navigator with the diver descending vertically at the ninety degree angle.
Figure 22:
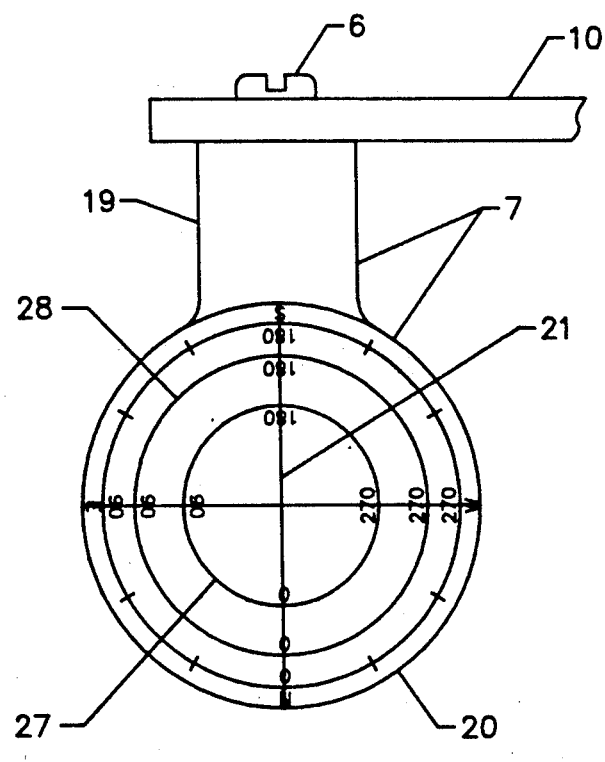
FIG. 22 is a companion illustration to FIG. 21 showing the compass at the ninety degree vertical angle as viewed by the diver.

The surface of the spherical compass assembly 22, FIG. 16, is inscribed with directional symbols which include alphabetic letters, numerals, lines and indices to assist the using diver in maintaining a chosen underwater course. Asimuth indications for the heading direction of the diving mask follow the traditional N, S, E, W, and 0, 90, 180, 270 degree markings. To provide the diver with elevation references, parallel circumscriptions 27-31, each orthogonal to the earth's gravitational vertical established by the ballast 23, are applied to the surface of the compass assembly 22. When floated within the compass shell 20 the symbols 27-31 represent descending or ascending angles of attack ranging typically D60, D30, 0, A30, A60 degrees for indices 27, 28, 29, 30, and 31 respectively. FIGS. 17-22 illustrate the operation of the diver's navigating face mask. In FIG. 17 the diver is swimming horizontally on a northerly course and will see a display as shown in FIG. 18. FIG. 19 illustrates the diver swimming upward at a 30 degree ascending angle in the northerly direction in which he will see a display as shown in FIG. 20. FIG. 21 illustrates the swimmer in a vertical dive in which he will see a display as shown in FIG. 22. Thus the mask may rotate about the compass magnet in the directions of roll, pitch, and yaw.

Figure 23:
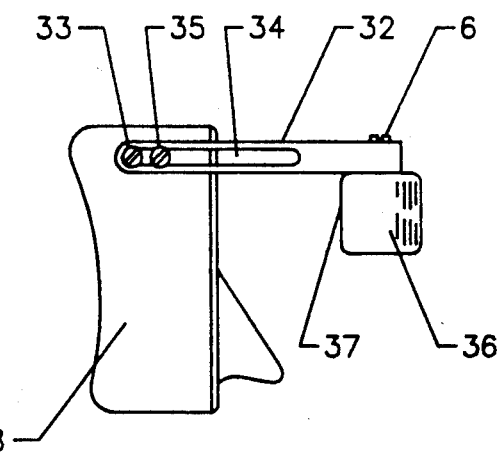
FIG. 23 is an elevation view of a second embodiment of a diver's mask navigator, illustrating the right side of the mask.
Figure 24:
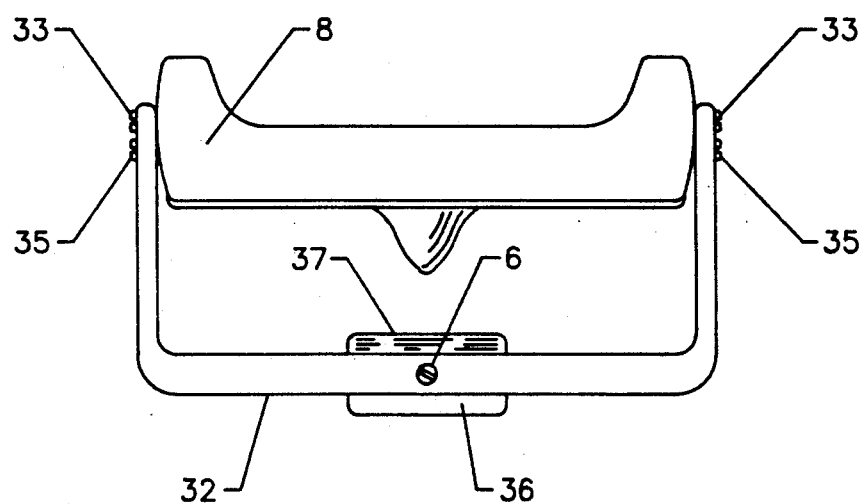
FIG. 24 is a top plan view of the second embodiment of a diver's mask navigator, shown in the compass extended operational position.
Figure 25:
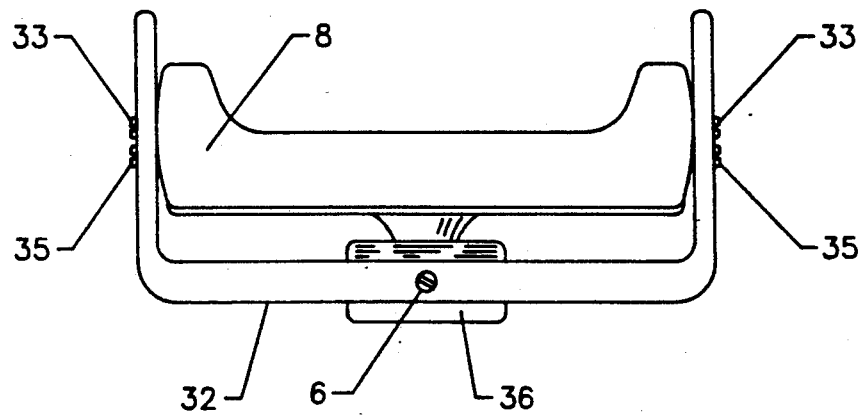
FIG. 25 is a top plan view of the second embodiment of a diver's mask navigator illustrating the compass in its non-operating storage position.
Figure 26:
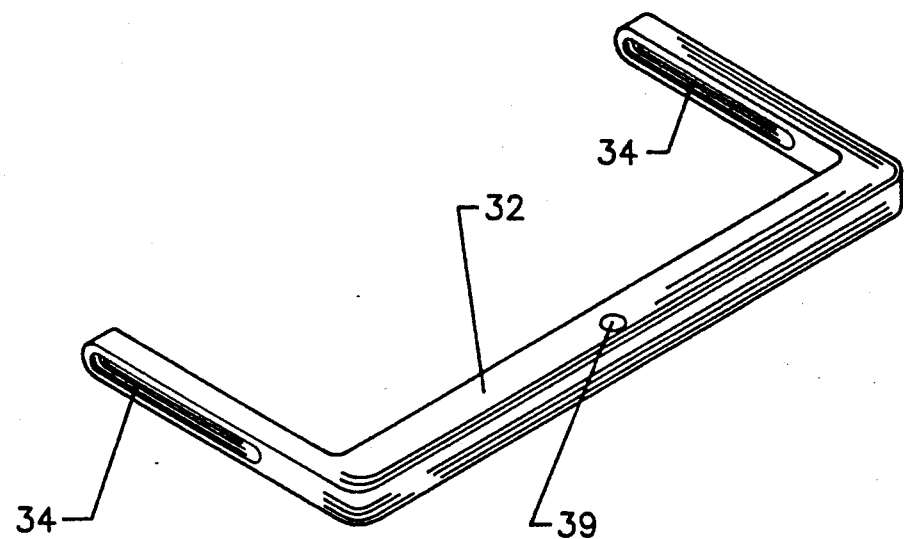
FIG. 26 is a perspective view of the adjustable U-bracket for the compass of my second embodiment of a diver's face mask navigator.

A second embodiment of my invention is illustrated in FIGS. 23-26 wherein a forward and rearward adjustable bracket 32 bridges the face seal 8 to which it is attached by mounting screws 33 and stabilizing screws 35 which project through the adjustment slots 34 into the face seal 8. The direction indicating compass subassembly of either the magnetic 7 or electronic fluxgate 36 types is suspended from the bracket 32 at the central location by a machine screw 6 inserted through the bracket hole 39 into the compass threaded receiving cavity 24 or 38. FIGS. 23-24 show the bracket 32 adjusted for viewing the compass, 7 or 36, and FIG. 25 illustrates the position of the bracket 32 when the face mask navigator is prepared for storage. The mask bridging bracket 32, FIG. 26, has an adjustment slot 34 in each of the opposing sides.

Figure 27:
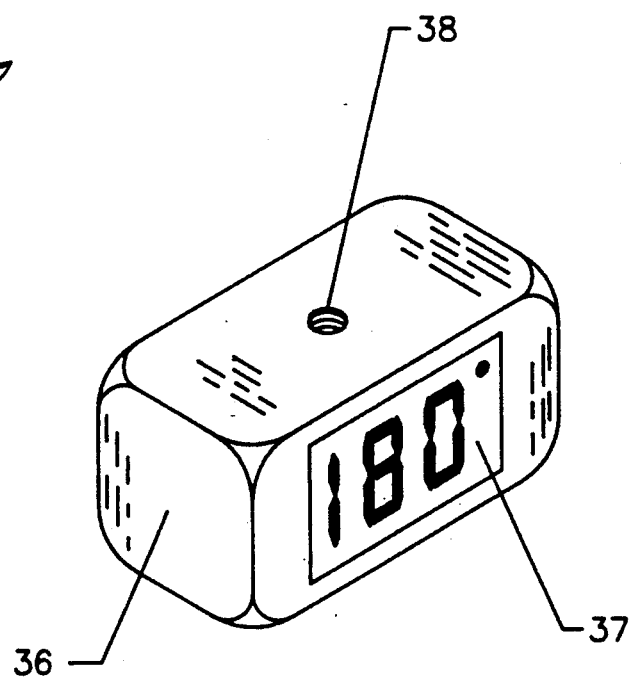
FIG. 27 is a perspective view of an electronic digital directional indicator for a diver's face mask navigator of either the first or second embodiments of FIGS. 1-6 and FIGS. 23-26 respectively.

A self-contained electronic direction indicator or compass 36, FIG. 27, available commercially having a digital display 37 of direction, as shown in FIGS. 23-25 may be used with the pivoting bracket 10, FIGS. 1-3 in lieu of the magnetic compass assembly 7. Similarly the magnetic compass assembly 7 may be used with the bridging bracket 32.

Figure 28:
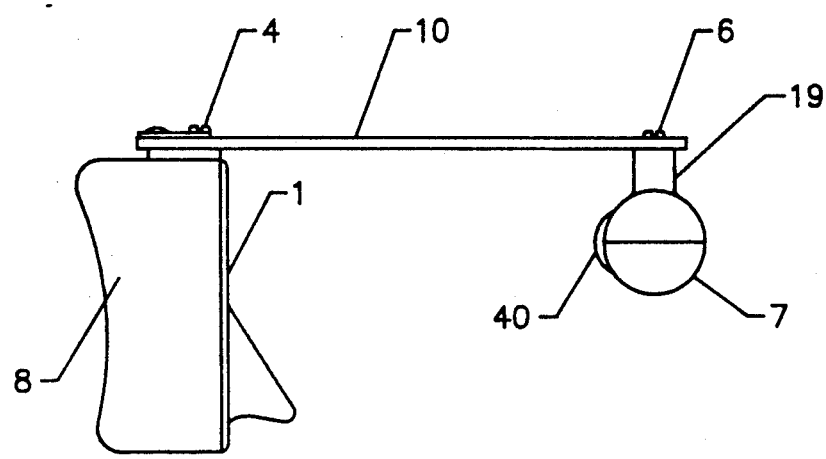
FIG. 28 is a right side elevation view of a diver's mask having a spherical compass with an integrally molded viewing lens on the transparent shell housing.
Figure 29:
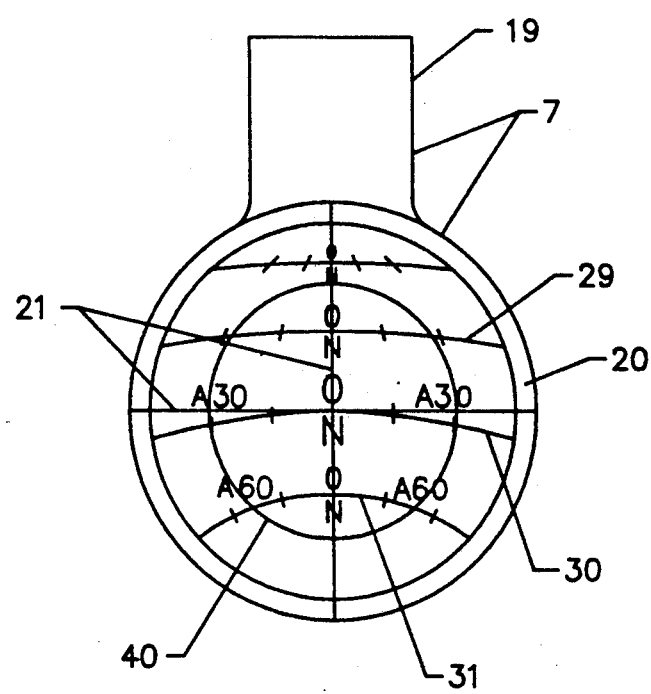
FIG. 29 illustrates the magnification of the compass symbols affected by the viewing lens of FIG. 28.
Figure 30:
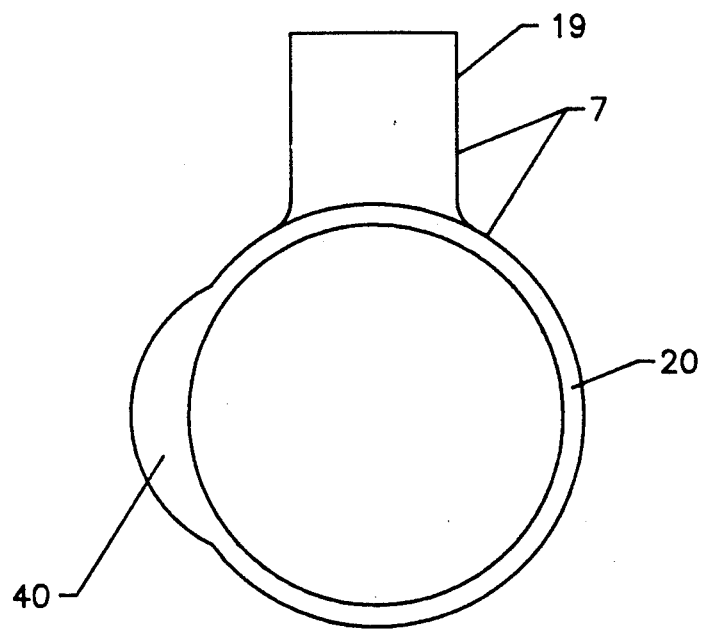
FIG. 30 is a cross sectional view through the transparent shell housing and viewing lens of FIG. 28.

Modifications of the spherical direction indicator are illustrated in FIGS. 28-32 where magnification of compass markings and symbols is achieved with a viewing lens that is integrated with the compass subassembly 7. Readability of the compass symbols is improved and the separation distance from the diver's eyes for focusing upon the compass subassembly 7 may be shortened. If the magnification is sufficient, the compass subassembly 7 can be positioned close to the mask eliminating the need for an adjustable bracket 10 but employing only single eye vision. In FIGS. 28 and 30 the molded transparent spherical shell housing 20 of the compass subassembly 7 is modified in thickness in a portion of its viewing surface to establish a magnifying lens 40 which is effective, FIG. 29 to enlarge the apparent viewed size of the symbols 27-31 which are inscribed upon the holder 22 of the floated compass assembly, FIGS. 15 and 16.

Figure 31:
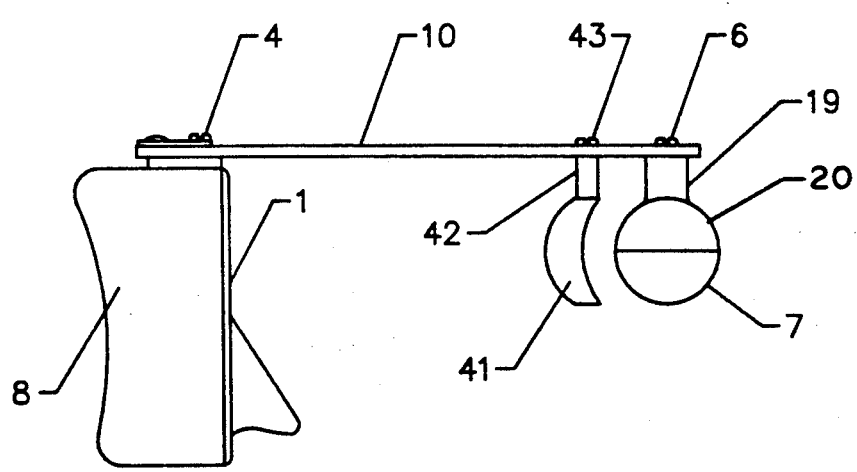
FIG. 31 is a right side elevation view of a diver's mask having a spherical compass with an adjacent discrete viewing lens.
Figure 32:
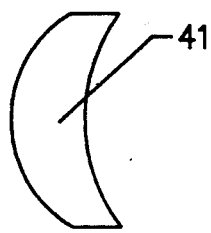
FIG. 32 is a cross sectional view of a meniscus magnifying lens for the diver's mask of FIG. 31.

FIGS. 31 and 32 illustrate a discrete lens 41 which may be attached in near proximity to the compass subassembly 7 by post 42 in the viewing path between the diver's eyes and the compass transparent housing shell 20. In a configuration which does not require an adjustable bracket 10 the magnifying lens 41 can be affixed to the mask window 1 for monocular viewing of the compass. All of the lens-spherical compass designs are fully functional and readable regardless of the orientation of the diver's head because the distance between the lens 41 and compass symbols 27-31 does not vary. The fixed relationship between the lens 41 and compass subassembly 7 permit the lens 41 to act as a sighting device as it magnifies only the symbols 27-31 which indicate the current direction. The discrete lens 41 is typically of the meniscus and plano convex types. The discrete lens 41 requires modification of either the pivoting bracket 10, FIG. 9, or the bridging bracket 32, FIG. 27, for a means of attachment as illustrated. In this disclosure the term "symbols" is intended to cover the directional inscriptions comprising alphabet letters and numerals, lines of latitude or longitude, and intermediate indices. The directional indicator or compass inscriptions are calibrated to display for the diver wearing the mask navigator that angular heading or bearing that the diver is facing.

Having described preferred embodiments of my invention and its operation by illustrations it should be understood that modifications are possible without departing from the invention the scope of which is set forth in the following appended claims in which I claim:

1. A navigational device for personal use, comprising:
   a) a face mask with a transparent window for binocular vision when said device is worn by a user;
   b) a directional indicator for attachment to said face mask;
   c) a multiplicity of symbols displayed on said indicator to identify the directional orientation of said indicator and said mask; and
   d) a means for attaching said directional indicator to said mask at a stable location and distance from said mask to permit a user to focus his eyes upon said directional indicator for continuous availability of direct binocular viewing of said directional symbols.

2. A navigational device, as described in claim 1, wherein said directional indicator comprises:
   a) an electronic compass sensitive to the earth's magnetic field, and
   b) a digital display of directional headings, responsive to the physical orientation of said diver's mask in said earth's magnetic field.

3. A navigational device, as described in claim 1, wherein said directional indicator comprises:
   a) a permanent magnet sensitive to the earth's magnetic force field; and b) a means for rotation of said magnet in horizontal and vertical planes relative to said mask.

4. A navigational device, as described in claim 3, wherein said indicator further comprises:
   a) a holder for said magnet which has an outside configuration at least a portion of which approximates a sphere;
   b) a sealed transparent container for said holder;
   c) a transparent liquid within said sealed container, said liquid with physical characteristics that support said holder and permit rotation of said mask in roll, pitch, and yaw about said magnet, said magnet responsive to said earth's magnetic force; and
   d) a ballast for said holder for stabilizing said magnet in the local horizontal plane, said ballast responsive to the earth's gravitational force.

5. A navigational device, as described in claim 4, which further comprises:
   a) a multiplicity of display symbols on said holder which permit said user to gauge the angular orientation of said mask relative to said holder.

6. A navigational device, as described in claim 5, wherein said display symbols comprise:
   a) ascent reference symbols.

7. A navigational device, as described in claim 5, wherein said display symbols further comprise:
   a) visible light radiating inscriptions responsive to absorption of incident radiation from external sources.

8. A navigational device, as described in claim 5, wherein said sealed transparent container comprises:
   a) a magnifying optical lens integrated in a sector of said transparent container for enhanced viewing of said directional symbols.

9. A navigational device, as described in claim 5, wherein said means for attaching said indicator to said mask comprises:
   a) a bracket interposed between said mask and said indicator, adjustable by said user within a range of distances of said display symbols from said user's eyes; and
   b) means, operable by said user, for storage of said indicator in near proximity of said mask for protection of said indicator and for reduction of the volume of space 10. A navigational device, as described in claim 9, wherein said bracket comprises:
    a) an elongated bar comprising:
       means at a first end of said bar for attaching said directional indicator;
       means near a second end of said bar for rotation of said bar about a pivot axle that is secured on said face mask; and
       means near said second end of said bar for locking said adjustable bracket at multiple positions, selectable by said user.

11. A navigational device, as described in claim 9, further comprising:
    a) a mounting block affixed to said face mask for assembling said bracket to said mask, said block comprising:
       a threaded cavity for receiving a pivot axle that is engaged in said bracket;
       a multiplicity of depressions in said block distributed at a uniform radius about said threaded cavity in said block; and b) a spring loaded detent for engagement with said multiplicity of block depressions for securing said bracket at discrete positions selectable by said user.

12. A navigational device, as described in claim 9, wherein said bracket comprises:
    a) at least one slot in said bracket for continuous forward and rearward adjustment of said directional indicator relative to the plane of the viewing window of said face mask.

13. A navigational device, as described in claim 9, wherein said bracket comprises:
    a) a central segment for bridging said face mask comprising:
       means for centrally attaching said directional indicator for said binocular viewing by said user;
    b) a first side segment interposed between said bridging central segment and said face mask; and
    c) a second side segment interposed between said bridging central segment and said face mask.

14. A navigational device, as described in claim 13, wherein said bracket further comprises:
    a) a slot in said first side segment for adjustment of said directional indicator in a range of one to four inches forward of the viewing window of said face mask; and
    b) a slot in said second side segment for coordinated adjustment of said directional indicator in said range of one to four inches forward of said mask viewing, window.

15. A navigational device, as described in claim 14, wherein said means for attaching said indicator to said mask further comprises:
    a) a first screw for projection through said adjustment slot in said first side segment for attachment of said bracket to said mask;
    b) a second screw for projection through said adjustment slot in said second side segment for attachment of said bracket to said mask;
    c) a third screw for projection through said first side segment adjustment slot for stabilizing said bracket in an adjusted position selected by said user; and
    d) a fourth screw for projection through said second side segment adjustment slot for stabilizing said bracket in said adjusted position selected by said user.

16. A device for underwater navigation of a diver, comprising:
    a) a diver's face mask;
    b) a directional indicator responsive, when said device is worn by said user, to movements of said diver and said mask in roll, pitch, and yaw in reference to the geodetic coordinate system, said directional indicator comprising:
       a compass sensitive to the earth's magnetic forces;
       a visible display of heading reference symbols relative to the earth's north, south, east, and west coordinates; and
    c) a means of adjustable attachment of said directional indicator to said diver's face mask for forward and rearward movement of said directional indicator relative to the viewing window of said face mask and for locating said directional indicator display of heading reference symbols within the binocular field of view of said diver's eyes.

17. A device for underwater navigation of a diver, as described in claim 16, further comprising:
    a) an inclinometer sensitive to the earth's gravitational forces; and b) a visible display of diving and ascending reference symbols relative to the local horizontal plane at the location of said diver.

18. A device for underwater navigation of a diver, as described in claim 17, wherein said displays of heading, diving and ascending references, comprise:
    a) visible light radiating symbols responsive to absorption of incident radiation from the diver's lamp and from external sources for enhanced readability of said directional indicator in turbid waters and in nighttime diving.

19. A device for underwater navigation of a diver, as described in claim 16, further comprising:
    a) a magnifying optical lens interposed in said field of view between said diver's eyes and said heading reference symbols for enhanced acuity in the diver's near field of vision.

20. A device for underwater navigation of a diver, as described in claim 16, wherein said means of attachment of said directional indicator to said face mask comprises:
    a) a range of at least one inch in reciprocal adjustment of the separation distance between said directional indicator and the viewing window of said face mask.

21. A device for underwater navigation of a diver, as described in claim 20, wherein said means of attachment comprises:
    a) an elongated bracket, responsive to said diver, for pivoting said directional indicator from a storage location at the side of said face mask to selectable positions within said diver's field of vision.

22. A device, for underwater navigation of a diver, as described in claim 20, wherein said means of attachment comprises:
    a) a bridging bracket in a U-configuration, responsive to said user, for advancing said directional indicator forward from a centered storage location into a continuum of positions within said diver's field of vision.

23. A device for underwater navigation of a diver, comprising:
    a) a diver's face mask including a transparent viewing window said mask to be worn by said diver;
    b) a directional indicator responsive to movements of said diver and said mask in roll, pitch, and yaw in reference to the geodetic coordinate system, said directional indicator comprising:
       a compass sensitive to the earth's magnetic forces;
       a visible display of heading reference symbols relative to the earth's north, south, east, and west coordinates, said display located within said diver's field of view;
    c) a means of attachment of said directional indicator to said diver's face mask for locating said directional indicator display of heading constantly within the direct binocular field of view of said diver's eyes for all motions and orientations of said diver's head; and
    d) a magnifying optical lens interposed in said field of view between said diver's eye and said heading reference display for enhanced acuity in the diver's near field of vision, said lens positioned to maintain a constant distance between said display and said lens regardless of the orientation of said diver.

24. A device for underwater navigation of a diver, as described in claim 23, further comprising:
    a) an inclinometer sensitive to the earth's gravitational forces; and
    b) a visible display of diving and ascending reference symbols relative to the local horizontal plane at the location of said diver.

25. A device for underwater navigation of a diver, as described in claim 23, wherein said magnifying optical lens is directly attached to said compass.

26. A device for underwater navigation of a diver, as described in claim 23, wherein said displays of heading, diving and ascending references, comprise:
    a) visible light radiating symbols responsive to absorption of incident radiation from the diver's lamp and from external sources for enhanced readability of said directional indicator in turbid waters and in nighttime diving.

* * * * *